(12) United States Patent
Hubrich et al.

(10) Patent No.: US 11,325,792 B2
(45) Date of Patent: May 10, 2022

(54) LOADING STATION FOR A POCKET CONVEYOR

(71) Applicant: Vanderlande Industries B.V., Veghel (NL)

(72) Inventors: Udo Hubrich, Lemgo (DE); Ralf Ferdinand Schneuing, Bielefeld (DE)

(73) Assignee: Vanderlande Industries B.V., Veghel (NL)

( * ) Notice: Subject to any disclaimer, the term of this patent is extended or adjusted under 35 U.S.C. 154(b) by 0 days.

(21) Appl. No.: 17/262,156

(22) PCT Filed: Jul. 24, 2019

(86) PCT No.: PCT/EP2019/069906
§ 371 (c)(1),
(2) Date: Jan. 21, 2021

(87) PCT Pub. No.: WO2020/020940
PCT Pub. Date: Jan. 30, 2020

(65) Prior Publication Data
US 2021/0269254 A1  Sep. 2, 2021

(30) Foreign Application Priority Data

Jul. 27, 2018  (DE) .......................... 102018212591.0

(51) Int. Cl.
| B65G 47/61 | (2006.01) |
| B65G 17/20 | (2006.01) |
| B65G 19/00 | (2006.01) |

(52) U.S. Cl.
CPC .................................. B65G 47/61 (2013.01)

(58) Field of Classification Search
None
See application file for complete search history.

(56) References Cited

U.S. PATENT DOCUMENTS 6,419,077 B1 *  7/2002  White .................. A22C 15/002
                                                  198/433
10,005,616 B2 *  6/2018  Fenile .................... B65G 47/61
(Continued)

FOREIGN PATENT DOCUMENTS

| CH | 713 089 A1 | 4/2018 |
| DE | 10 2004 018 569 A1 | 11/2005 |

(Continued)

OTHER PUBLICATIONS

International Search Report and Written Opinion dated Oct. 28, 2019 in connection with International Application No. PCT/EP2019/069906, and English translation thereof.

(Continued)

*Primary Examiner* — Kavel Singh
(74) *Attorney, Agent, or Firm* — Wolf, Greenfield & Sacks, P.C.

(57) ABSTRACT

A loading station for a pocket conveyor having two conveying lines. The loading station has a receiving section for receiving pockets for each conveying line; a receiving section for objects, with which the pockets are to be loaded; and a device for each conveying line, into each of which an empty pocket to be filled can be introduced. In addition, the loading station has a moving unit for moving the devices from a receiving section for objects to one of the receiving sections for receiving pockets, and back again. The loading station is also designed to alternately load the pockets of the first conveying line and the pockets of the second conveying line.

16 Claims, 7 Drawing Sheets

(56) References Cited

U.S. PATENT DOCUMENTS

| | | |
|---|---|---|
| 2012/0037272 A1 | 2/2012 | Wend et al. |
| 2017/0369248 A1 | 12/2017 | Fenile |
| 2017/0369250 A1 | 12/2017 | Fenile et al. |
| 2018/0002115 A1 | 1/2018 | Fenile et al. |
| 2018/0305131 A1 | 10/2018 | Fenile et al. |
| 2018/0312341 A1 | 11/2018 | Keller et al. |
| 2018/0354728 A1 | 12/2018 | Sigrist |

FOREIGN PATENT DOCUMENTS

| | | |
|---|---|---|
| DE | 10 2010 033 905 A1 | 2/2012 |
| EP | 3 305 689 A1 | 4/2018 |
| WO | WO 2017/088076 A1 | 6/2017 |

OTHER PUBLICATIONS

International Preliminary Report on Patentability dated Feb. 11, 2021 in connection with International Application No. PCT/EP2019/069906, and English translation thereof.

\* cited by examiner

LOADING STATION FOR A POCKET CONVEYOR

CROSS-REFERENCE TO RELATED APPLICATIONS

This application is a national stage filing under 35 U.S.C. § 371 of international application PCT/EP2019/069906, filed Jul. 24, 2019, which claims priority to German application 10 2018 212 591.0, filed Jul. 27, 2018, each of which is herein incorporated by reference in its entirety.

BACKGROUND OF THE INVENTION

Technical Field

The invention relates to a loading station for a pocket conveyor having two conveying lines and to a method for loading pockets of a pocket conveyor having two conveying lines.

Description of the Prior Art

In the prior art, overhead conveyors are known with which pockets are conveyed suspended on rails to transport objects. To convey objects it is necessary to load them into the pockets so that the loaded pockets can then be conveyed further and sorted, for example. Filling devices or loading devices are used to load the pockets.

EP 3 305 689 discloses a transporting device in the form of an overhead conveyor with a filling device for filling pockets. The filling device is integrated into the conveying line and interrupts it by firstly connecting a conveying line for conveying empty pockets to a bridging transporting device which moves the pockets laterally such that the pockets are arranged in an open state before the end of a conveyor belt. Once the pockets have been filled, they are conveyed further transversely to the transporting direction and are suspended again in a laterally offset continuation of the conveying line.

This filling device has the disadvantage that firstly the conveying line has to be interrupted to allow loading/filling, and at the same time, in the case of transporting devices having more than one conveying line, each conveying line requires its own filling device, which complicates the conveying process since the conveying of parts to be loaded has to be divided up. Moreover, considerable space is required in this case, since each filling device moves the conveying line for filled pockets laterally to the conveying line for empty pockets; the costs and amount of maintenance required also increase proportionally with each further conveying line. A further disadvantage of this filling device is that both the pockets themselves and the opening and closing of the pockets are complex since to open the pocket one half of the pocket pouch has to be removed from an upper frame of the pocket so that the removed half of the pocket pouch can be lowered for loading. In addition, the pocket also has to be actively closed again by suspending the half of the pocket pouch back in the upper frame. This requires accurate alignment and precise positioning of the pocket.

DE 10 2004 018 569 discloses a pocket with an upper frame, to which a pocket pouch is attached and which has a hook rotatably attached to one side. The pocket can be transported with the hook. Moreover, the pocket is in a closed state when it is suspended on the hook, since the frame is pulled down by the weight of the pocket pouch and any contents therein such that an area spanned by the frame is aligned so as to be almost parallel to one side of the pocket pouch. When the pocket is pulled from the hook, the frame can be pulled against a guide so that the area spanned by the frame is substantially in a horizontal plane. In this state, the area spanned by the frame is exposed and the pocket can be filled through the frame. When the pocket is transported further and brought out of the guide, it closes independently due to the weight of the pocket pouch and any contents therein. As a result, it is not necessary to remove a side of the pocket pouch from the upper frame or to re-introduce one therein.

EP 2 196 415 relates to a loading station for an overhead conveying system in which a step is built into the conveying line, by means of which an empty pocket is moved from the top to the bottom in order to arrange it so as to be open at the end of a conveyor belt. In the open state the pockets are loaded and then the loaded pockets are transported away again via the downwardly offset continuing conveying line.

This loading station has the disadvantage that a loading station is required for each conveying line. As a consequence, a conveyor belt for conveying the goods to be loaded is also required for each conveying line, which complicates the conveying process since the conveying of the parts to be loaded has to be divided, and also the costs and the amount of maintenance required increase proportionally with each further conveying line.

DESCRIPTION OF THE INVENTION

In view of the prior art, the object is therefore to provide a loading station for a pocket conveyor having more than one conveying line, which allows conveyed objects to be loaded efficiently into the pockets of both transporting lines of a pocket conveyor, without increasing the amount of space required and the complexity of the conveying process.

This object is achieved by a loading station according to claim 1 and by a method of loading pockets as according to claim 10. Advantageous embodiments of the invention are described in the dependent claims.

A loading station according to the invention for a pocket conveyor having two conveying lines comprises a receiving section for receiving pockets for each conveying line; a receiving section for objects with which the pockets are to be loaded; a device for each conveying line, into which an empty pocket to be filled can be introduced, and a moving unit for moving the devices from a receiving section for objects to one of the receiving sections for receiving pockets, and back again. Furthermore, the loading station is designed to alternately load the pockets of the first conveying line and the pockets of the second conveying line.

With this loading station, two conveying lines of a pocket conveyor can be efficiently loaded with just one receiving section for objects to be loaded.

In the present context, the phrase "alternately load" means that a pocket of a first conveying line is loaded first, and then a pocket of a second conveying line is subsequently loaded. These two loading processes can be carried out in such a way that the first loading process is completed before the second loading process is carried out. However, there may be a temporal overlap in the movement of the devices into which the pockets can be introduced, either before or after one of the two loading processes. Preferably, the movement of the two devices takes place simultaneously, i.e. while one device is located at the receiving section for objects, the other device is positioned at a receiving section for receiving pockets and both devices move at the same time to the respective other receiving section.

In the present context, the term "loading" describes introducing an object into a pocket.

In the present context, the phrase "receiving section for objects" describes a receiving section to which objects to be loaded in pockets are conveyed. In this context, the pockets to be loaded are not to be understood to be objects within the meaning of the invention.

The loading station may be designed in such a way that a pocket can be loaded in one device while a loaded pocket is removed from the other device. In addition, when loading the first pocket an empty pocket can also be introduced into the other device. If the other device is empty, it is only possible to introduce an empty pocket into the other device while a pocket is being loaded in one device.

Preferably, the devices are designed in such a way that a pocket that has been introduced therein is open. This makes the loading process easier since an additional step of opening the pocket prior to loading will not be necessary.

For example, the frame of the pocket disclosed in DE 10 2004 018 569 can simply be pulled over a guide such that the pocket is opened when it is introduced into the device since its upper frame is rotated by the guide such that the pocket can be filled through the frame.

The receiving section for objects can be formed from a conveyor belt, which is preferably inclined, or an inclined chute is arranged at the end thereof such that the object to be loaded falls into the pocket. This allows objects to be easily loaded into the pocket.

Preferably, the devices can be moved orthogonally or substantially orthogonally to the conveying direction of the conveying lines. This allows the loading station according to the invention to be placed easily and in a space-saving manner between two conveying lines.

The devices can be mounted on a common frame. This allows the devices to be driven by way of a common motor, so that maintenance and operating costs can be reduced.

Preferably, the loaded pockets are transported away in a longitudinal direction of the loading station orthogonal to the direction of movement of the devices. This allows the conveying lines to continue behind the loading station without a vertical or horizontal offset or space-saving arrangement of the loading station.

Preferably, the devices each comprise a suspending element on which the pockets can be suspended in the devices. This allows a simple handover of the pockets from the conveying line to the devices and allows the pockets to be suspended in the device in an open state.

Preferably, the loading station comprises a rod (guide rod) on at least one of the receiving sections for receiving pockets, which rod is preferably aligned horizontally such that at least one section of a pocket slides over the rod when it is introduced into the loading station. In particular, the rod may be arranged in such a way that a section of the pocket pouch slides over the rod when the pocket is introduced into the receiving section.

A receiving section according to the invention for a loading station comprises a rod (guide rod) which is preferably aligned horizontally, over which a section of an empty pocket can glide when it is introduced. In particular, the rod may be arranged in such a way that a section of the pocket pouch slides over the rod when the pocket is introduced into the receiving section.

When the pocket is introduced into the loading station, rotational movements (torsional movements) may occur as a result of slowing down and small changes in direction or corrections to the direction of the pocket in the receiving sections may occur, which bring about a torsional movement of the pocket. This may lead to the frame of a pocket being introduced into the loading station in a twisted manner. In order for the pocket to be able to be opened by guides as described above, the pocket must be correctly aligned since otherwise the guide cannot rotate the frame of the pocket and therefore the pocket will not be able to be opened.

By providing such a (guide) rod, a rotational movement of the pocket about its vertical axis during the introduction thereof will be slowed down by a section of the pocket sliding over the rod. When at least a part of a pocket pouch slides, it clings to the rod since it is flexible, and a part below the rod may even swing further than the rod in the transporting direction. This part swings back (counter to the transporting direction) or is pulled back over the rod (counter to the transporting direction) since the pocket is transported further on the frame and the pocket pouch is therefore pulled further over the rod. The part of the pocket above the rod is pulled in the transporting direction, as a result of which a part of the pocket below the rod, which has swung further than the rod in the transporting direction, is first moved back (counter to the transporting direction) and then moved around the rod again in the transporting direction. As a result, a part of the pocket pouch is slowed down or even has a speed component counter to the transporting direction. This part is accelerated again in the transporting direction by the onward transportation, as a result of which the pocket is pulled "smoothly".

A method according to the invention of loading pockets of a pocket conveyor having two conveying lines comprises the following steps:
  introducing an empty pocket into a first device which is located in a first conveying line,
  moving the first and a second device in such a way that the first device is moved to a receiving section for objects and the second device is moved to the second conveying line, loading the empty pockets in the first device, introducing an empty pocket into the second device, moving the first device back to the first conveying line and moving the second device to the receiving section for objects, loading the pocket in the second device, and introducing an empty pocket into the first device.

With this method of loading, two conveying lines of a pocket conveyor can be loaded efficiently.

Preferably, the method also comprises a step of removing a loaded pocket from one of the devices.

It is also preferable that the first and second devices are moved together.

Moreover, the step of loading the pocket into one of the first or second devices can be carried out at the same time as a step of removing a loaded pocket from the other of the first or second devices and/or introducing an empty pocket into the other of the first or second devices.

Carrying out these steps simultaneously allows one pocket to be prepared for the next loading process while another pocket is being loaded. This results in the loading of the pockets being more efficient still.

In the steps of introducing the pockets into the devices, the pockets are preferably suspended in the devices. This allows the pockets to be loaded easily.

Further advantages of the invention are described in the entirety of the claims and the description of the drawings below.

MODES OF CARRYING OUT THE INVENTION

In the following, a loading station for a pocket conveyor having two conveying lines as according to the present invention will be described with reference to the accompanying drawings. A method of loading pockets of a pocket conveyor having two conveying lines will also be described in the following. The same elements or features of the loading station according to the invention are provided with the same reference numbers and there will be no repeated descriptions of such devices and features. Instead, reference is made to the description of the previous drawing.

FIGS. 1 to 7 show a loading station 1 for a pocket conveyor 2 having two conveying lines 21 and 23. The pocket conveyor 2 comprises two conveying lines 21 and 23. Pockets 25, 26 can be transported on these conveying lines 21 and 23. In this preferred embodiment, empty pockets 25 are/will be arranged/transported in front of the loading station 1 and full/loaded pockets 26 are/will be arranged/transported behind the loading station. The loading station 1 comprises a frame 110 on which the devices 105, 106, into each of which an empty pocket 25 to be loaded can be introduced, are mounted in such a way that these devices can be moved laterally, substantially transversely to the conveying direction of the pocket conveyor 2.

In the preferred embodiment, the devices 105 and 106 are formed from two side walls 105a and 105b or 106a and 106b and a bottom side. This arrangement is particularly clear to see in FIG. 5, due to the position of the devices 105, 106 relative to the frame 110. A carrier or support 115 is attached to at least one of the side walls 105a, 105b, 106a, 106b, in which the pocket 25 can be suspended.

The devices 105, 106 do not have to be formed in this way, however, and may instead assume any form at all, as long as the pockets 25, 26 can be introduced into these devices 105 and 106 in an open state. For example, the devices 105 and 106 may be made from boxes having just one opening, and the pockets are introduced into these boxes from above. Otherwise, the device may also merely consist of a support 115 which carries the pockets 25, 26 in such a way that they are in an open state, and neither side walls nor a bottom side has to be provided. The devices 105 and 106 merely have to be designed in such a way that empty pockets 25 can be suspended, the empty pockets 25 can be filled and the pockets 25, 26 can be moved laterally both in an empty state and in a filled state.

Preferably, the devices are moved by way of a common motor (not shown). However, the devices 105 and 106 can also be moved separately from one another by way of individual drive sources.

The devices 105 and 106 can be moved back and forth between a receiving section 101a and 101b for receiving pockets 25 and a receiving section 103 for an object 27 (receiving section 103 for objects 27).

Guides 112 are installed behind the positions of the devices 105 and 106 below the conveying lines 21 and 23 (i.e. at the receiving sections 101a and 101b for receiving pockets), in order to simplify the removal of pockets 26 from the devices 105 and 106.

Figure 7:
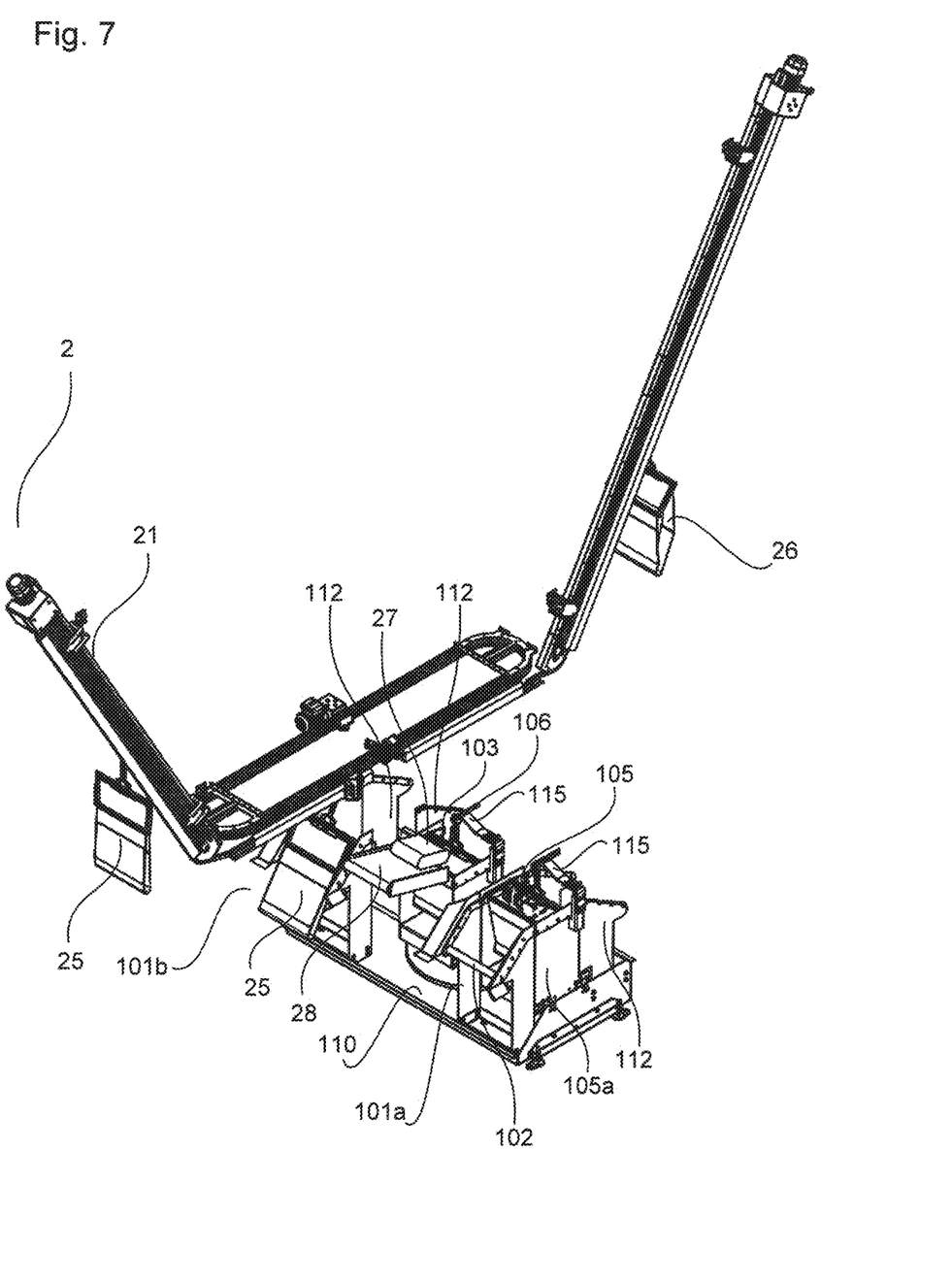
FIG. 7 is a perspective view of the loading station and of a section of a pocket conveyor having two conveying lines from the feed side of the pockets and the objects to be loaded.

FIG. 7 shows the loading station 1 from the feed side of the empty pockets 25. In particular, the receiving sections 101a and 101b for receiving pockets 25 and the receiving section 103 for objects 27 are shown here. In the receiving section 101a for receiving pockets 25, the rod 102 can be seen. In the other receiving section 101b for receiving pockets 25, the rod 102 is hidden by a pocket 25. The conveyor belt 28 is inclined downward at the receiving section 103 for objects 27, such that the objects 27 can easily slide/fall into the pockets.

The receiving sections 101a and 101b for receiving pockets 25 are provided with lateral guides, so that if the pockets 25, which are conveyed via the conveying lines 21 and 23, comprise a movement component transverse to the conveying direction, they can be introduced into the devices 105 and 106 without this movement component. Moreover, guides in the receiving sections 101a and 101b serve to open the pockets by a frame in the upper end of the pockets sliding over the guides and thereby rotating such that the frame is substantially parallel to a horizontal plane and the pocket opens.

In this embodiment, the device 105 can be moved back and forth between the receiving position 103 for objects 27 and the receiving section 101a below the conveying line 21. The device 106 can be moved back and forth between the receiving section 103 for objects 27 and a receiving section 101b for receiving pockets 25 below the conveying line 23.

In the following, a mode of operation of the loading station will be described with reference to FIGS. 2 to 6.

Figure 1:
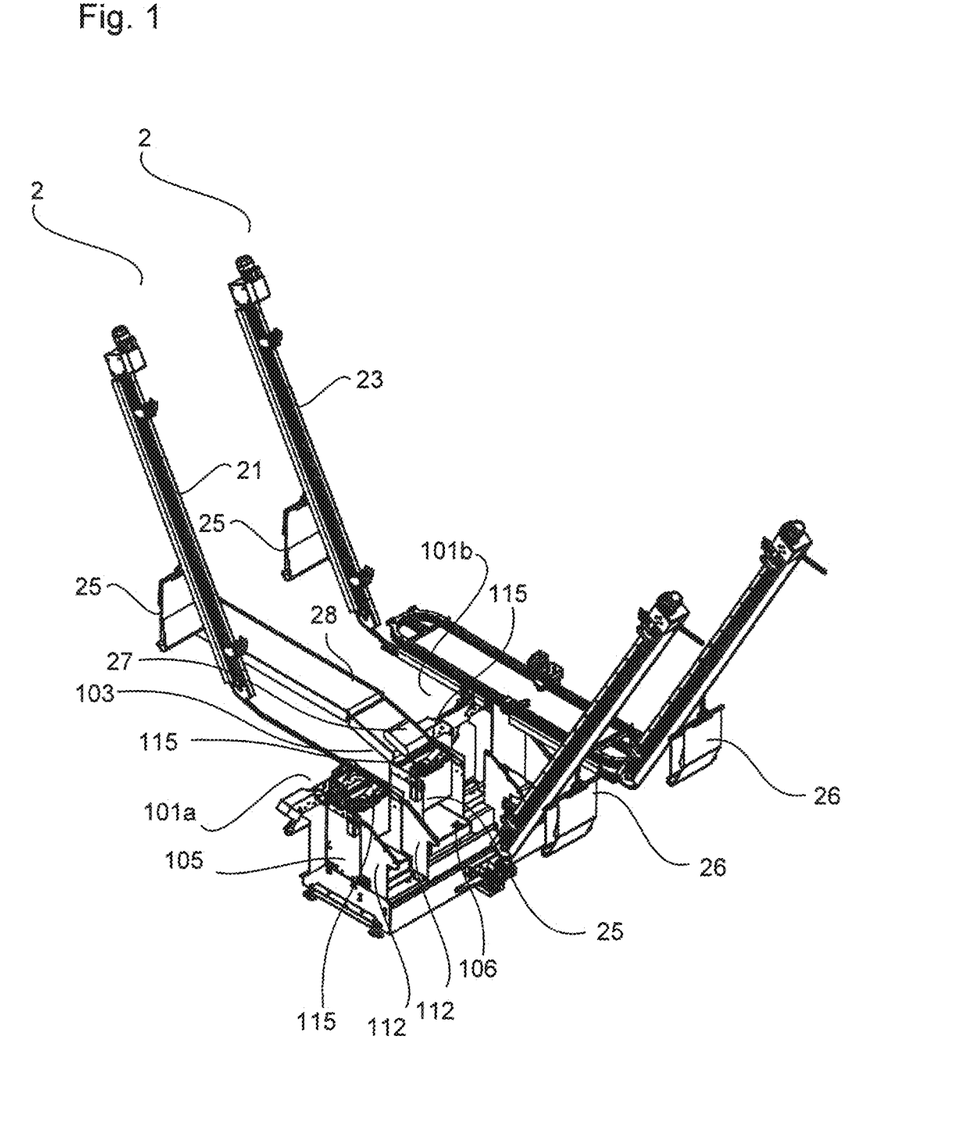
FIG. 1 is a perspective view of a loading station for a pocket conveyor having two conveying lines and of a section of the pocket conveyor.
Figure 2:
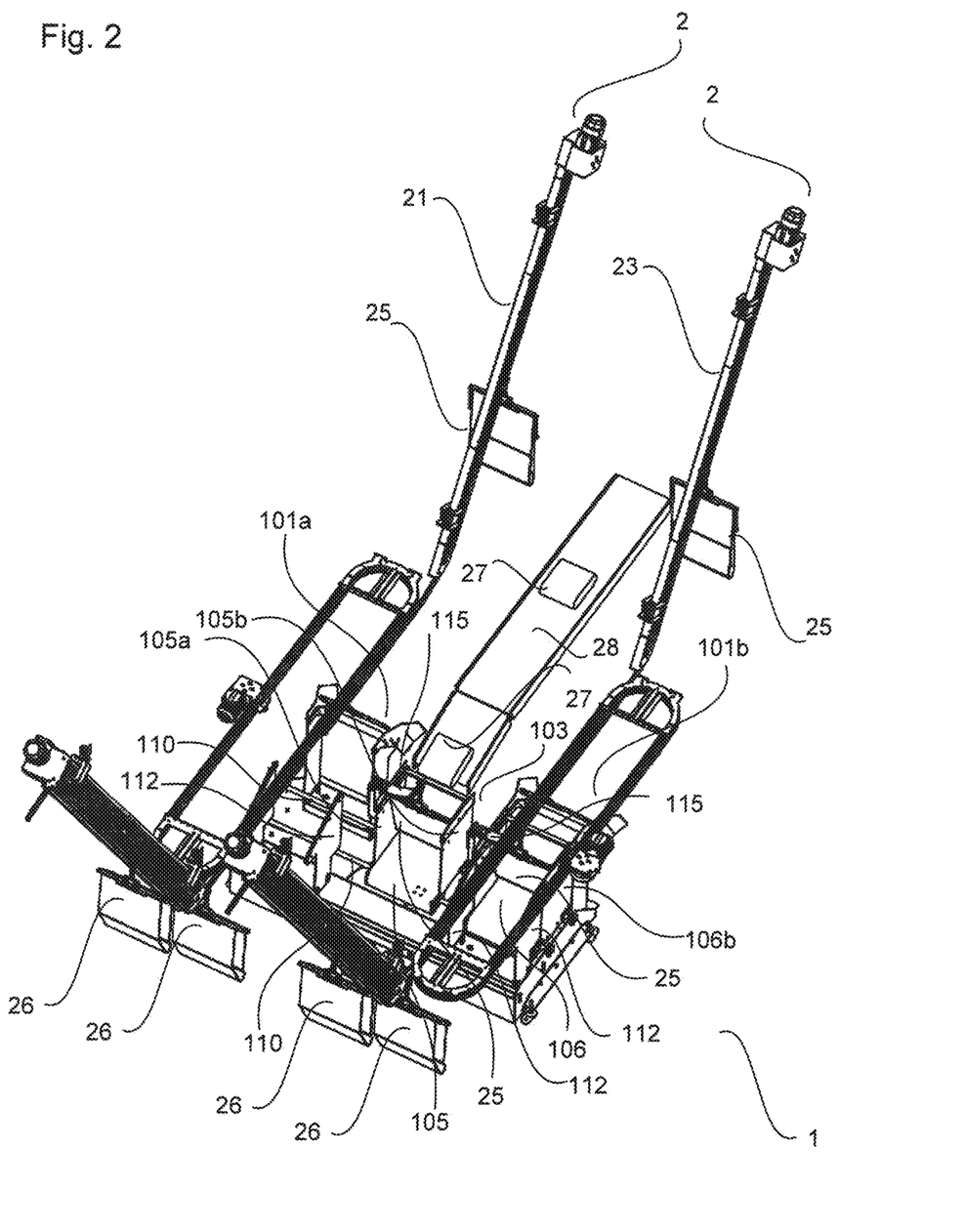
FIG. 2 is a perspective view of the loading station and of a section of the pocket conveyor, which shows a state of the loading station during the activation thereof.

FIG. 2 shows an operating state of the loading station 1, in which an empty pocket 25 is introduced into each of the two devices 105 and 106. In this preferred embodiment, the pockets 25, 26 are suspended in the devices 105 and 106. The device 105 is located at the receiving section 103 for objects 27. The object 27 is conveyed to the loading station 1 via the conveyor belt 28. In this embodiment, the receiving section 103 for objects 27 is arranged centrally between the conveying lines 21 and 23. However, the receiving section 103 for objects 27 may also be arranged differently and the objects 27 can be fed from above.

In the present state, the pocket 25 in the device 105 is not yet filled. In FIG. 2, the packet 27 is conveyed via the inclined conveyor belt 28 and then falls into the pocket 25 in the device 105, as a result of which the pocket is loaded. When the pocket 25 in the device 105 is loaded, the device 105 is moved to a position at the receiving section 101a for receiving pockets and in this embodiment the device 106 with an empty pocket 25 introduced thereto is simultaneously brought to the receiving section 103 for objects 27. This movement is shown in FIG. 3 and will be described in the following.

Figure 3:
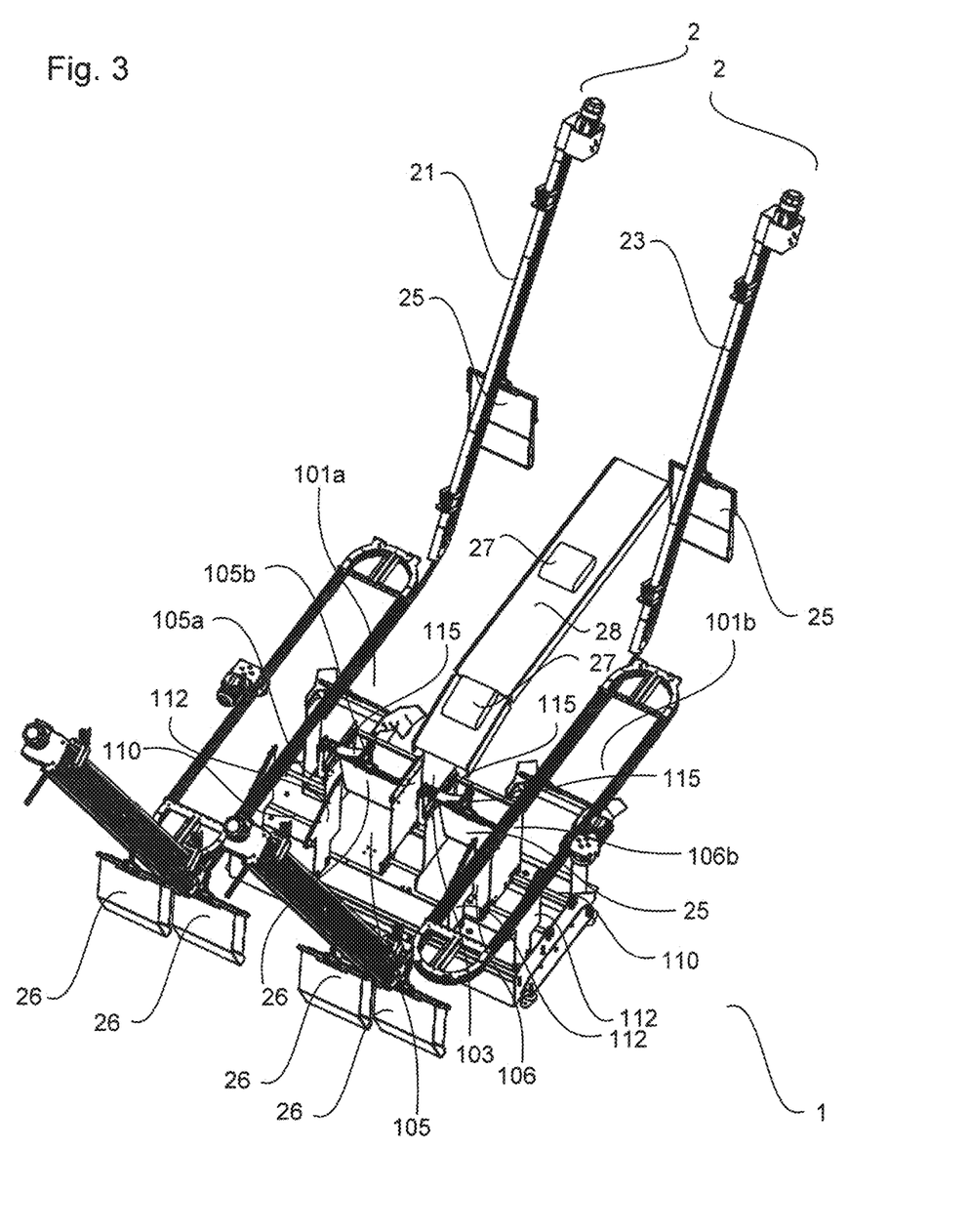
FIG. 3 is a view of the loading station from the same perspective as in FIG. 2, which shows a further operating state of the loading station.

Contrary to what is shown in FIG. 3, the movement does not have to happen at the same time and the devices 105 and 106 may be controlled and moved separately. In the preferred embodiment, the devices 105 and 106 are mounted to a common frame 110 and are moved simultaneously.

In FIG. 3, an operating state is shown in which the filled pocket 26 which has been introduced into the device 105 is positioned between the receiving section 101 for receiving pockets and the receiving section 103 for objects 27 and the pocket 25 which has been introduced into the device 106 is located in a position between a receiving section 101b for receiving pockets 25 and a receiving section 103 for objects 27. In this state, an empty pocket 25 is installed in the device 106.

Figure 4:
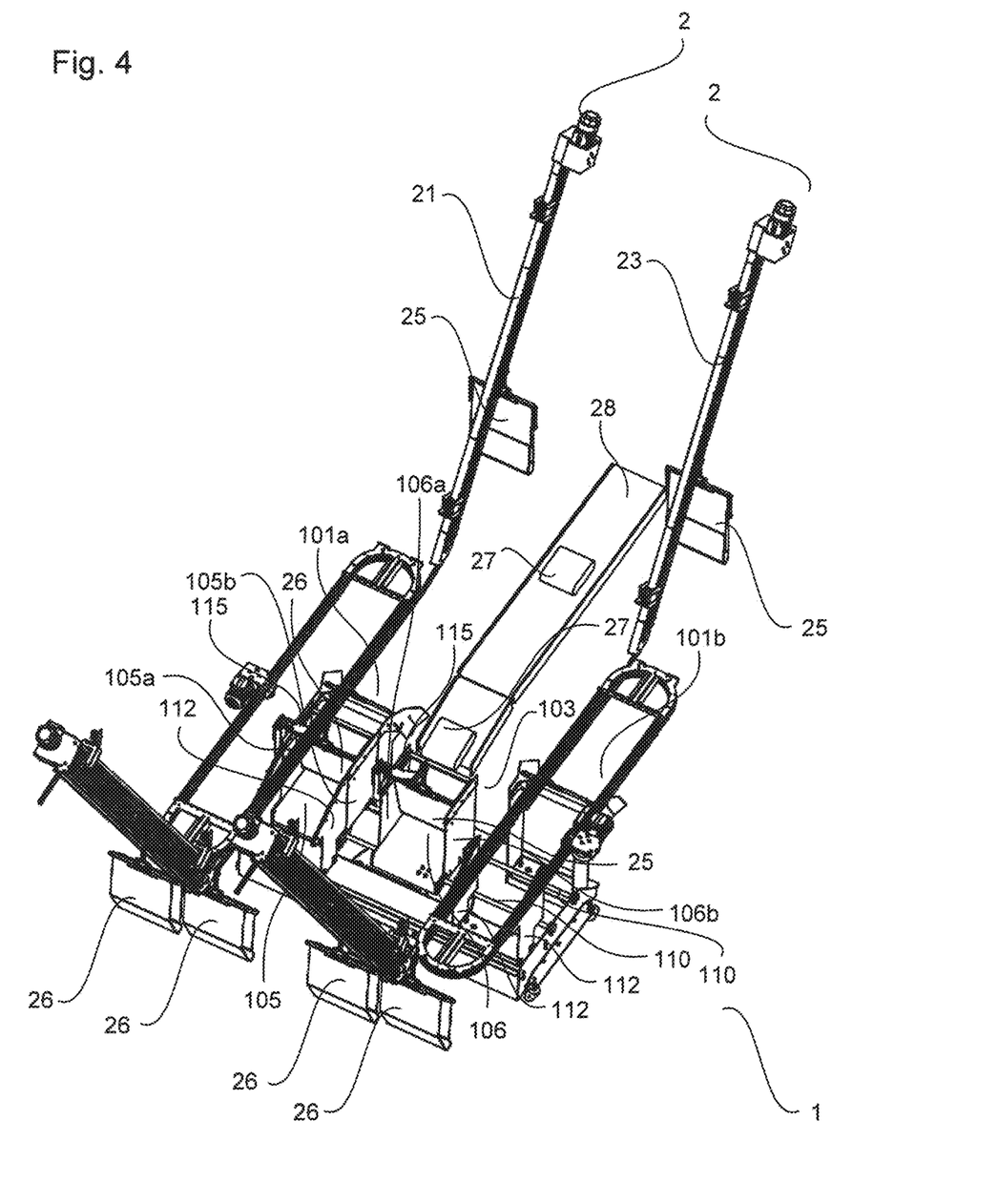
FIG. 4 is a view of the loading station from the same perspective as in FIG. 2, which shows a further operating state of the loading station.

The devices 105 and 106 are subsequently moved further, such that the device 105 is positioned at a receiving section 101a for receiving pockets 25 and the device 106 with the empty pocket 25 introduced thereto is located at the receiving section 103 for objects 27. This state is shown in FIG. 4. The filled pocket 26 is now removed from the device 105 and carried out via the conveying line 21 in the same direction as the direction in which the pocket was introduced. Once the filled pocket 26 has been carried out, an empty pocket is introduced into the device 105. In the meantime, an object 27 is loaded via the conveyor belt 28 into the empty pocket 25 which has been introduced into the device 106, as previously described in connection with the device 105.

Consequently, the device 105 is provided with an empty pocket 25 and the device 106 is provided with a loaded pocket 26.

Figure 5:
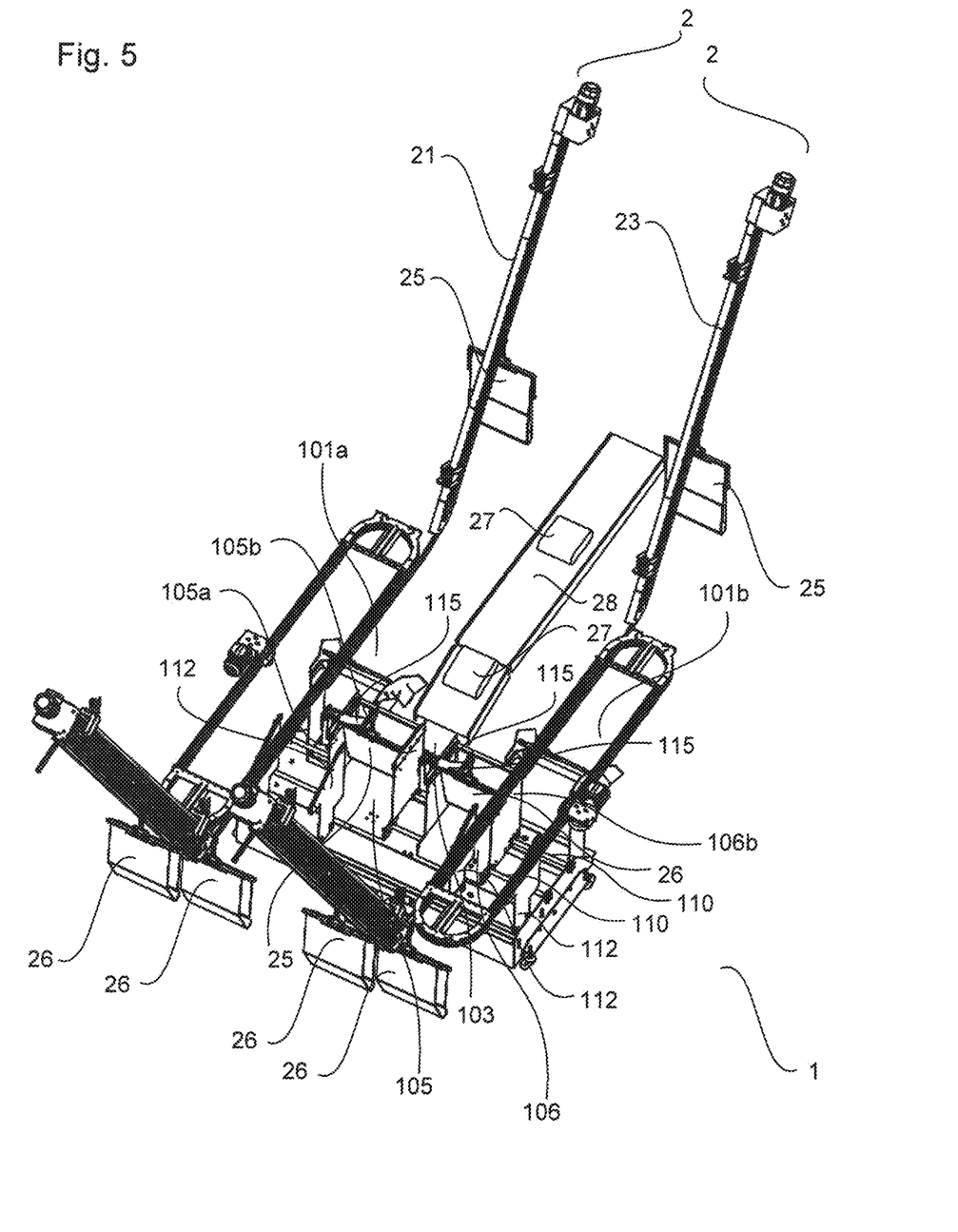
FIG. 5 is a view of the loading station from the same perspective as in FIG. 2, which shows a further operating state of the loading station.

Next, the devices 105 and 106 are moved back, as shown in FIG. 5. In FIG. 5 the device 105, into which an empty pocket 25 has been introduced, is positioned between a receiving section 101a for receiving pockets and a receiving section 103 for objects 27. The device 106, with a pocket 26 which has been introduced into the device and is loaded with the object 27, is positioned between the receiving section 101b for receiving pockets and the receiving section 103 for objects 27.

Figure 6:
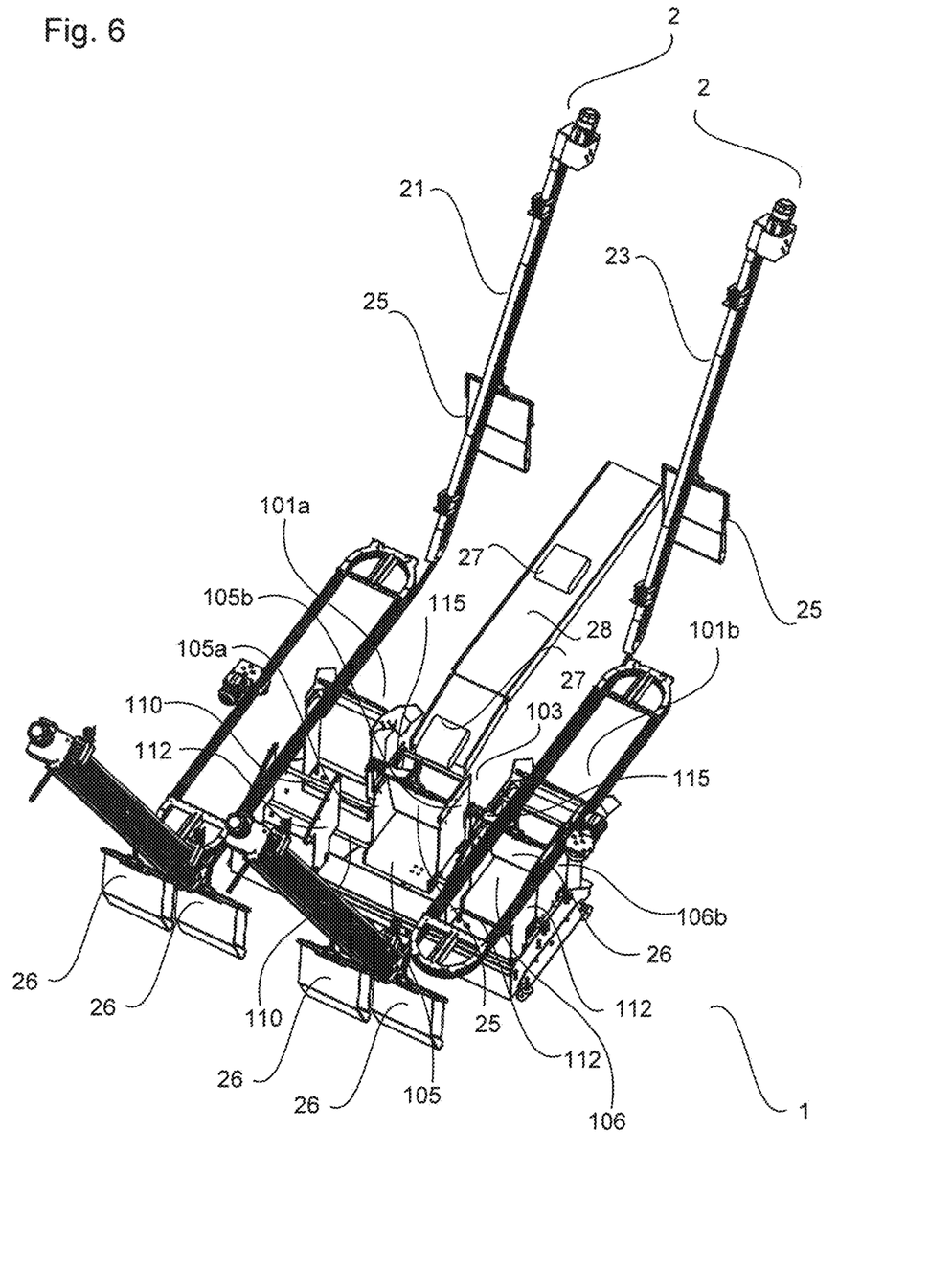
FIG. 6 is a view of the loading station from the same perspective as in FIG. 2, which shows a further operating state of the loading station.

The movement is continued and then, as shown in FIG. 6, an empty pocket 25 which has been introduced into the device 105 is located at the receiving section 103 for objects 27, such that an object can be loaded into the pocket 26 which has been introduced into the device 105, and the device 106 with the pocket 26, which was loaded in the previous step, is located at the receiving section 101b for receiving pockets, such that the loaded pocket 26 can be removed from the device 106 and carried out from the loading device via the conveying line 23. Moreover, an empty pocket from the conveying line 23 is introduced into the device 106.

As a consequence, a loaded pocket 26 is once again located in the device 105 and an empty pocket 25 is once again located in the device 106, such that the method of alternately loading pockets can start from the beginning again.

The invention claimed is:

1. A loading station for a pocket conveyor having first and second conveying lines, the loading station comprising:
a first pocket receiving section configured to receive pockets for the first conveying line;
a second pocket receiving section configured to receive pockets for the second conveying line;
an object receiving section configured to receive objects which are to be loaded in the pockets;
a first device associated with the first conveying line and a second device associated with the second conveying line, each of the first and second devices being configured to receive an empty pocket to be filled with an object,
a moving unit configured to move each of the first and second devices from the object receiving section to a corresponding one of the first and second pocket receiving sections for receiving pockets, and back again,
the loading station being designed to alternately load the objects from the object receiving section into the empty pockets of the first conveying line and the empty pockets of the second conveying line.

2. The loading station according to claim 1, wherein the loading station is configured to load a pocket in one of the first and second devices while a loaded pocket is removed from the other of the first and second devices and/or an empty pocket is introduced into the other.

3. The loading station according to claim 1, wherein each of the first and second devices is designed in such a way that a pocket introduced thereto is open.

4. The loading station according to claim 1, wherein the object receiving section for objects includes a conveyor belt.

5. The loading station according to claim 1, wherein each of the first and second devices is configured to be moved orthogonally or substantially orthogonally to the conveying direction of the first and second conveying lines.

6. The loading station according to claim 1, wherein the first and second devices are mounted on a common frame.

7. The loading station according to claim 1, wherein guides are formed so as to be aligned with outer ends of the first and second devices when the first and second devices are in a position in which loaded pockets are removed or empty pockets are introduced.

8. The loading station according to claim 1, wherein the loaded pockets are transported away in a longitudinal direction of the loading station orthogonal to the direction of movement of the first and second devices.

9. The loading station according to claim 1, wherein the first and second devices include a suspending element on which the pockets can be suspended in the first and second devices.

10. The loading station according to claim 1, wherein at least one of the first and second pocket receiving sections for receiving pockets is provided with a rod, over which a section of an empty pocket can slide.

11. A receiving section for a loading station comprising a rod, over which a section of an empty pocket can slide so as to slow down a rotational movement of the pocket.

12. A method for loading pockets of a pocket conveyor having first and second conveying lines, a first device being associated with the first conveying line and a second device being associated with the second conveying line, the method comprising acts of:
introducing an empty pocket into the first device located in the first conveying line,
moving the first device to an object receiving section for objects and moving the second device to the second conveying line,
loading the empty pocket in the first device at the object receiving section,
introducing an empty pocket into the second device located in the second conveying line,
moving the first device from the object receiving station to the first conveying line and moving the second device from the second conveying line to the object receiving section, loading the pocket in the second device at the object receiving section, and introducing an empty pocket into the first device located in the first conveying line.

13. The method according to claim 12, wherein the method also comprises removing a loaded pocket from one of the first and second devices.

14. The method according to claim 12, wherein the first and second devices are moved together.

15. The method according to claim 12, wherein the act of loading the pocket in one of the first or second devices is carried out while carrying out an act of removing a loaded pocket from the other of the first or second devices and/or of introducing an empty pocket into the other of the first or second devices.

16. The method according to claim 12, wherein the acts of introducing the pockets into the first and second devices includes suspending the pockets in the first and second devices.

\* \* \* \* \*